(12) United States Patent
Lucy et al.

(10) Patent No.: US 7,148,787 B2
(45) Date of Patent: Dec. 12, 2006

(54) REMOTE KEYLESS ENTRY CIRCUIT HAVING TRANSIENT PULSE SUPPRESSION

(75) Inventors: Scott J. Lucy, Lake Orion, MI (US); Joseph E. Ploucha, Sterling Heights, MI (US); Brian Farrell, Clawson, MI (US); Torsten Frerichs, Regensburg (DE)

(73) Assignee: Siemens VDO Automotive Corporation, Auburn Hills ( * ) Notice: Subject to any disclaimer, the term of this patent is extended or adjusted under 35 U.S.C. 154(b) by 342 days.

(21) Appl. No.: 10/925,869

(22) Filed: Aug. 25, 2004

(65) Prior Publication Data

US 2005/0068153 A1    Mar. 31, 2005

Related U.S. Application Data

(60) Provisional application No. 60/497,573, filed on Aug. 25, 2003.

(51) Int. Cl.
*H04Q 9/00* (2006.01)
*H02G 3/00* (2006.01)
*G01R 31/28* (2006.01)
*H04L 25/08* (2006.01)

(52) U.S. Cl. .................. 340/5.72; 340/5.64; 307/10.1; 307/10.3; 714/699; 375/346; 455/343.1

(58) Field of Classification Search ............... 340/5.72, 340/5.64; 307/10.1, 10.3; 714/699; 375/346; 455/343.1
See application file for complete search history.

(56) References Cited

U.S. PATENT DOCUMENTS 5,920,268 A * 7/1999 Bucci et al. ............... 340/5.64
5,937,065 A * 8/1999 Simon et al. ............... 380/262
6,236,850 B1 * 5/2001 Desai ....................... 455/343.2

* cited by examiner

*Primary Examiner*—Jeffery Hofsass
*Assistant Examiner*—Scott Au

(57) ABSTRACT

A remote keyless entry (RKE) circuit (100) and method reduces the amount of current draw by duty cycling the RKE circuit (100) to ensure that a microcontroller (104) in the RKE circuit (100) is awakened only when needed to evaluate RF data. A total operating period for the RKE circuit (100) includes a transient period, a data monitoring period, and a sleep period. The RKE circuit (100) includes a pulse blocking circuit (109) that prevents a receiver stabilization pulse from waking up the microcontroller (104). If no data is received during the data monitoring period, the microcontroller (104) remains in a sleep mode for the remainder of the operating period.

17 Claims, 4 Drawing Sheets

REMOTE KEYLESS ENTRY CIRCUIT HAVING TRANSIENT PULSE SUPPRESSION

REFERENCE TO RELATED APPLICATIONS

This application claims the benefit of U.S. Provisional Appln. No. 60/497,573, filed Aug. 25, 2003.

TECHNICAL FIELD

The present invention relates to remote keyless entry (RKE) systems for vehicles, and more particularly to an RKE receiver requiring minimal current consumption.

BACKGROUND OF THE INVENTION

Remote keyless entry (RKE) circuits are extensively used in vehicles to provide a convenient way to lock and unlock vehicle doors. Current RKE circuits usually include a super-regenerative receiver or a super-heterodyne receiver to receive signals from a key fob. Super-regenerative receivers tend to have a wider bandwidth than super-heterodyne receivers and therefore admit more noise. However, super-regenerative receives are also less expensive, making them more desirable for meeting vehicle manufacturing cost requirements.

RKE circuits for receiving key fob signals draw current even when the vehicle is turned off because they need to be able to receive a key fob signal at any time and assess whether to unlock the vehicle door. The RKE circuit draws current from a main vehicle battery, which ideally has a minimized size to promote low cost and fuel economy. Thus, it is desirable for the RKE circuit to have a low biasing current draw. This may be difficult, however, because the RKE circuit has both a microcontroller and receiver that must be operating nearly continuously to detect the key fob signal, thereby constantly drawing current even when the vehicle is turned off.

The difference between the current draw of currently known RKE circuits and the desired current draw tends to be significant. For example, the microcontroller may draw a minimum of 10 mA and the receiver may draw 5 mA for a total current draw of 15 mA, which is significantly higher than the 2–3 mA current draw requirement for the entire electronic control unit (which includes the RKE circuit) in many design requests.

It is possible to reduce the overall current draw by switching the microcontroller and the receiver in the RKE circuit into a low-current sleep mode and periodically waking the microcontroller and the receiver to check for a key fob signal. The frequency and duty cycle of this wake function is dictated by a continuously running clock that draws very little current. In other words, the clock acts as a real-time interrupt counter for the microcontroller. Each time the counter overflows, the microcontroller wakes up, turns on the receiver, and then put itself back to sleep as the receiver operates for a selected finite timeframe. During the finite timeframe, the receiver will send any detected digital data bits to the microcontroller for evaluation.

Other methods include using a resistor-capacitor (RC) timing circuit connected to a transistor whose gate is connected to the capacitor. In this configuration, if a data bit of sufficient duration travels through the RC circuit, it will charge the capacitor, thereby biasing the gate of the transistor to turn it on and allowing current to reach the microcontroller to wake up the microcontroller. This method has the advantage of waking up the microcontroller on an as-needed basis to minimize current draw. However, large amounts of noise may also reach the microcontroller in a form that looks like data.

This noise is particularly pronounced when the microcontroller initially turns on the super-regenerative receiver, which creates a large stabilization pulse on the order of 3–4 ms long before any data is transmitted through the RC circuit. This stabilization pulse is large enough to look like data to the microcontroller and is substantially larger than a typical 500 microsecond data bit. Thus, if the microcontroller requires two data bits before responding (e.g., 1 ms worth of data) and the stabilization pulse is 3–4 ms, the time constant of the RC circuit must be adjusted to accommodate the stabilization pulse first and then any subsequent data.

During this time, the microcontroller remains turned on to wait for the stabilization pulse to pass before obtaining the data. Also, the RC circuit must have a time constant that is long enough to accommodate the stabilization pulse and to allow the microcontroller to obtain the data after the stabilization pulse. Keeping the microcontroller on for such a long period (i.e., the duration of the stabilization pulse and any subsequent data), however, undesirably increases current consumption of the RKE circuit.

There is a desire for an RKE circuit that is able to handle stabilization pulses that occur when the RKE circuit is cycled and retains the capability to resolve RF data transmitted while still keeping current consumption to a minimum.

SUMMARY OF THE INVENTION

The present invention is directed to an RKE circuit and method that reduces the amount of current draw by duty cycling the RKE circuit and ensuring that a microcontroller in the RKE circuit is woken up only when needed to evaluate data. A total operating period for the RKE circuit includes a transient period, a data monitoring period, and a sleep period. The RKE circuit includes a pulse blocking circuit that prevents a stabilization pulse, which is generated by the receiver when it is initially wakened by the microcontroller.

If the receiver demodulates data during the data monitoring period, the microcontroller is awakened to authenticate the data. If not, the microcontroller remains in a sleep mode for the remainder of the operating period. The receiver may be turned off after the data monitoring period expires to reduce current draw even further.

DETAILED DESCRIPTION OF THE PREFERRED EMBODIMENT

The invention generally avoids the problems associated with stabilization pulses described above by improving the way it detects data pulses in, for example, a key fob signal.

In the examples described below, it is assumed that the key fob signal will be 500 microseconds long and will be half Manchester-coded for illustrative purposes only. In this example, the 500 microsecond pulse will be, on average, 50% high and 50% low with a transition in between, but other pulse distributions are possible without departing from the scope of the invention. The invention may be designed to handle a worst-case scenario where the ratio between high and low in the half Manchester-coded signal is such that the ability to distinguish the signal from noise may be difficult (e.g., a high-to-low ratio of 40% of the signal frequency).

When a button on a key fob is pressed, multiple packets are sent (e.g., four identical packets). The packets contain an identification code to authenticate the key fob signal to ensure that the key fob signal can instruct only its corresponding RKE circuit to unlock. Of course, if the RKE circuit receives packets that are not authenticated, the RKE circuit will ignore the packets and keep the vehicle locked.

In this example, it is assumed that a minimum of two consecutive data packets need to be received by the RKE circuit for authentication. For half-Manchester key fob signals, for example, the RKE circuit will use a timing algorithm based on 2 kHz data to guarantee that, in a worst case situation, the RKE circuit will always obtain a minimum of two packets of data when the key fob is pressed.

Figure 4:
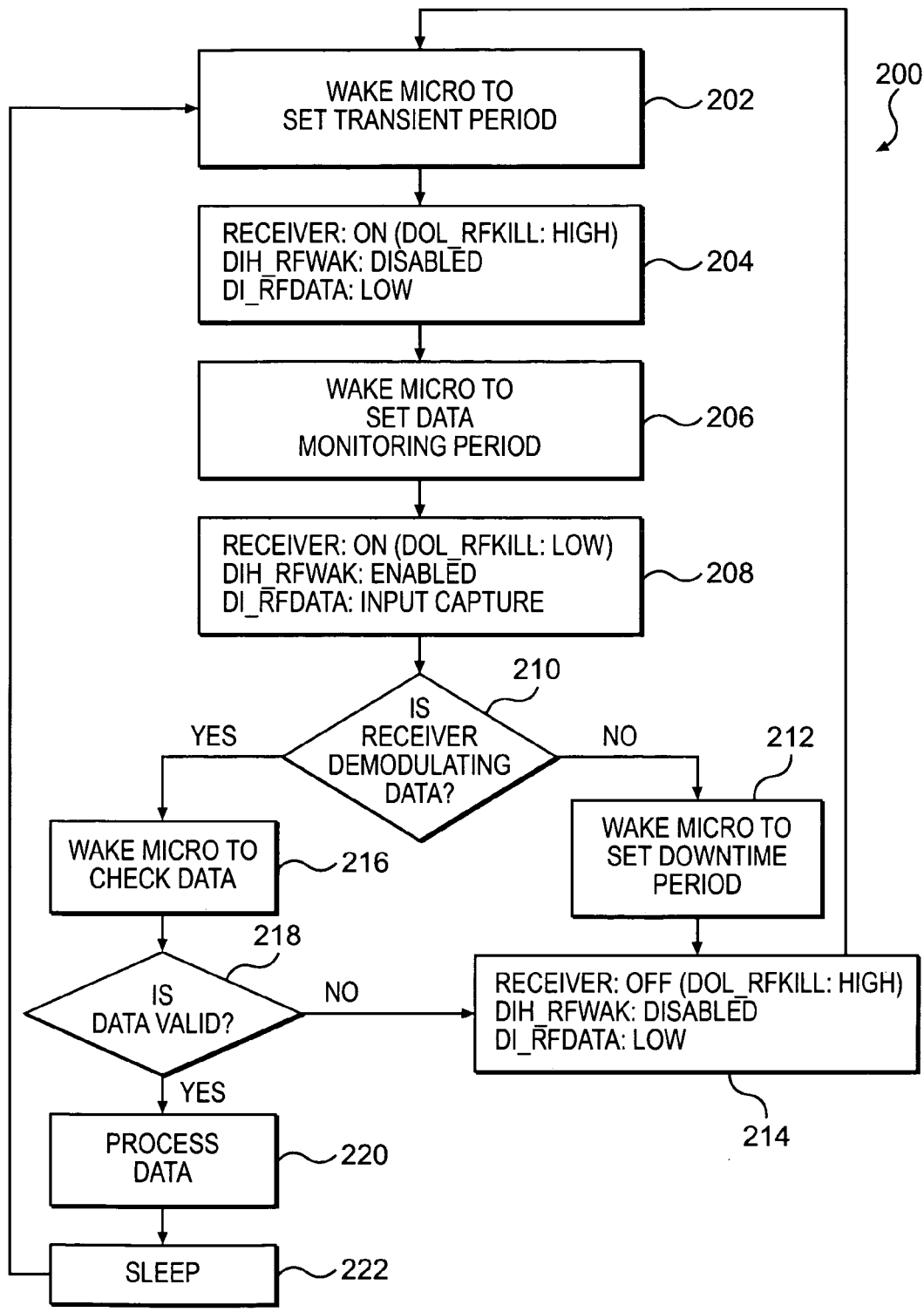
FIG. 4 is a flow diagram illustrating a method of operating an RKE circuit according to one embodiment of the invention.

In the examples described below and as shown in FIG. 4, it is assumed that the timing algorithm runs a receiver in the RKE circuit for 12 ms (broken into two consecutive segments of 4 ms and 8 ms) followed by a 40 ms sleep period for a total operating period of 52 ms, during each operation cycle while the ignition is turned off. The 4 ms segment acts as a transient period 50 for accommodating transient behavior in the RKE circuit, while the 8 ms segment 52 is a data monitoring period. The 40 ms segment is a sleep period 54 where the receiver in the RKE circuit is turned off. Thus, the receiver in the RKE circuit is turned on for 12 ms during each 52 ms total operating period 56. Note that the 4 ms transient period 50 is selected in this example because it is long enough to ensure that the transient stabilization pulse generated by the receiver does not awaken the microcontroller, even in an anticipated worst-case scenario where the stabilization pulse lasts up to 4 ms. However, the invention is easily applicable to other pulse widths and data protocols.

Figure 1:
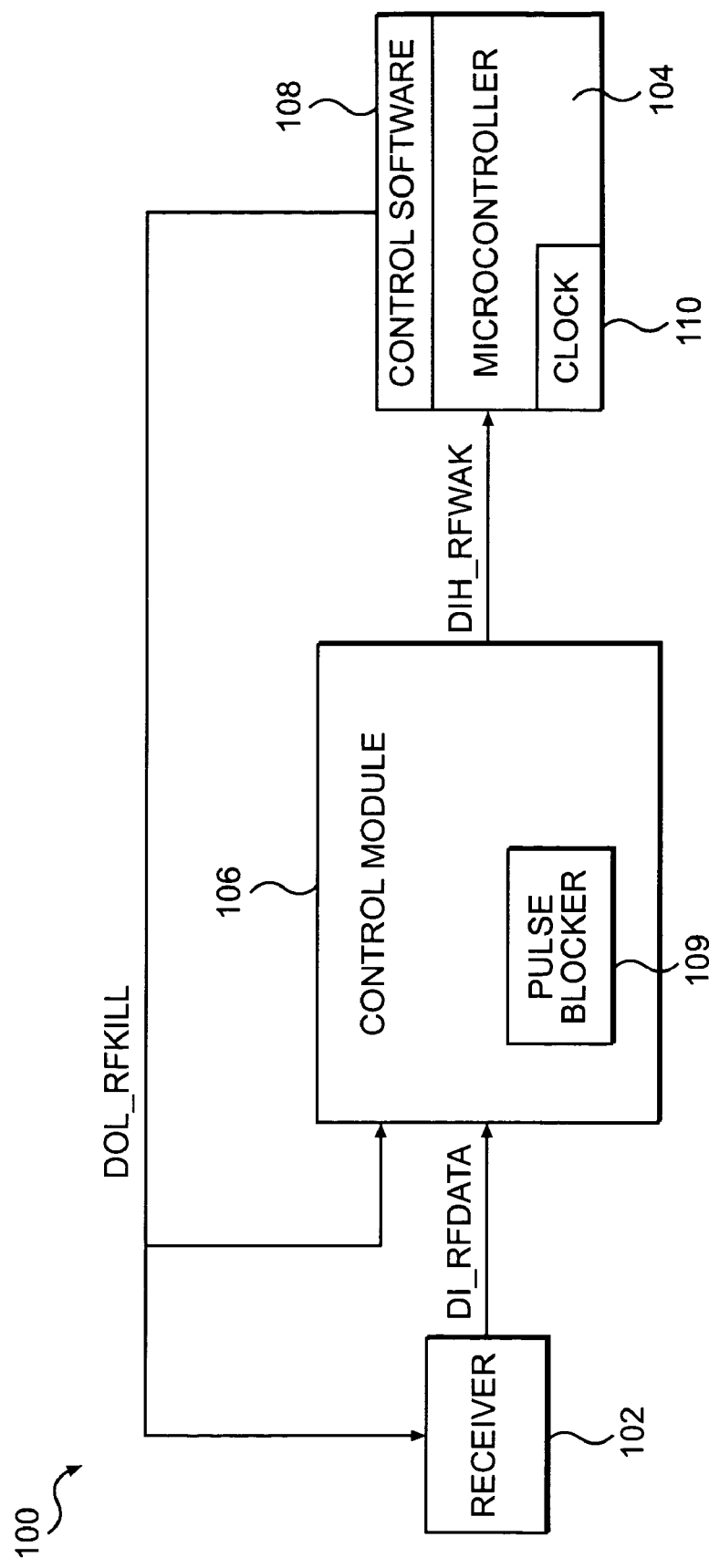
FIG. 1 is a representative block diagram illustrating an RKE circuit according to one embodiment of the invention.

FIG. 1 is a block diagram illustrating the general components of an RKE circuit 100 for a vehicle according to one embodiment of the invention. The RKE circuit 100 minimizes current consumption by preventing the two main components in the RKE circuit 100 responsible for the highest current draw from running normally while the vehicle is turned off. A microcontroller 104 normally operates in a low-power "sleep" mode when the vehicle is turned off to minimize current draw. When the microcontroller 104 wakes to demodulate key fob data, it enters a "run" mode, which draws more current than the sleep mode. The RKE circuit 100 duty-cycles a receiver 102 and places the microcontroller 104 in a low power sleep mode while the vehicle is turned off. Like currently known receivers, the receiver 102 in the system shown in FIG. 1 is turned on periodically by the microcontroller 104 at selected time intervals. By adjusting the timing at which the microcontroller 104 switches between a sleep mode and a run mode, it is possible to minimize the current drawn by the RKE circuit 100 while still periodically operating the receiver 102 to detect key fob signals timely and accurately.

When the microcontroller 104 wakes to conduct other operations, such as latching the receiver 102 on and off, it will immediately go back to sleep after it has completed its operation. To control waking of the microcontroller 104 when data is received by the receiver 102, a control module 106 disposed between the receiver 102 and the microcontroller 104 generates a rising edge interrupt at DIH_RFWAK; that is, the signal is a digital input active high to wake the microcontroller 104.

The control module 106 operates in response to two signals input onto two different lines. A DOL_RFKILL signal is a digital output generated by control software 108 (e.g., software used by the microcontroller 104) to turn the receiver 102 and the control module 106 on and off. In this example, DOL_RFKILL is inactive in the high state, turning the receiver 102 and control module 106 off, and active in the low state, turning the receiver 102 and control module 106 on. A receiver status line on the control module 106 reflects the state of DOL_RFKILL as well. The actual data demodulated by the receiver 102, as well as any stabilization pulses, travels through a data line (e.g., a DI_RFDATA line).

As explained previously, a stabilization pulse may be generated by the receiver 102 as the components in the receiver 102 stabilize each time the receiver is turned on. To prevent the control module 106 from treating the stabilization pulse as actual data and inadvertently waking the microcontroller 104 (which would undesirably increase current consumption in the RKE circuit), the control module 106 includes a pulse blocker circuit 109 that prevents the stabilization pulse from causing DIH_RFWAK to go high in response to the pulse.

Figure 2:
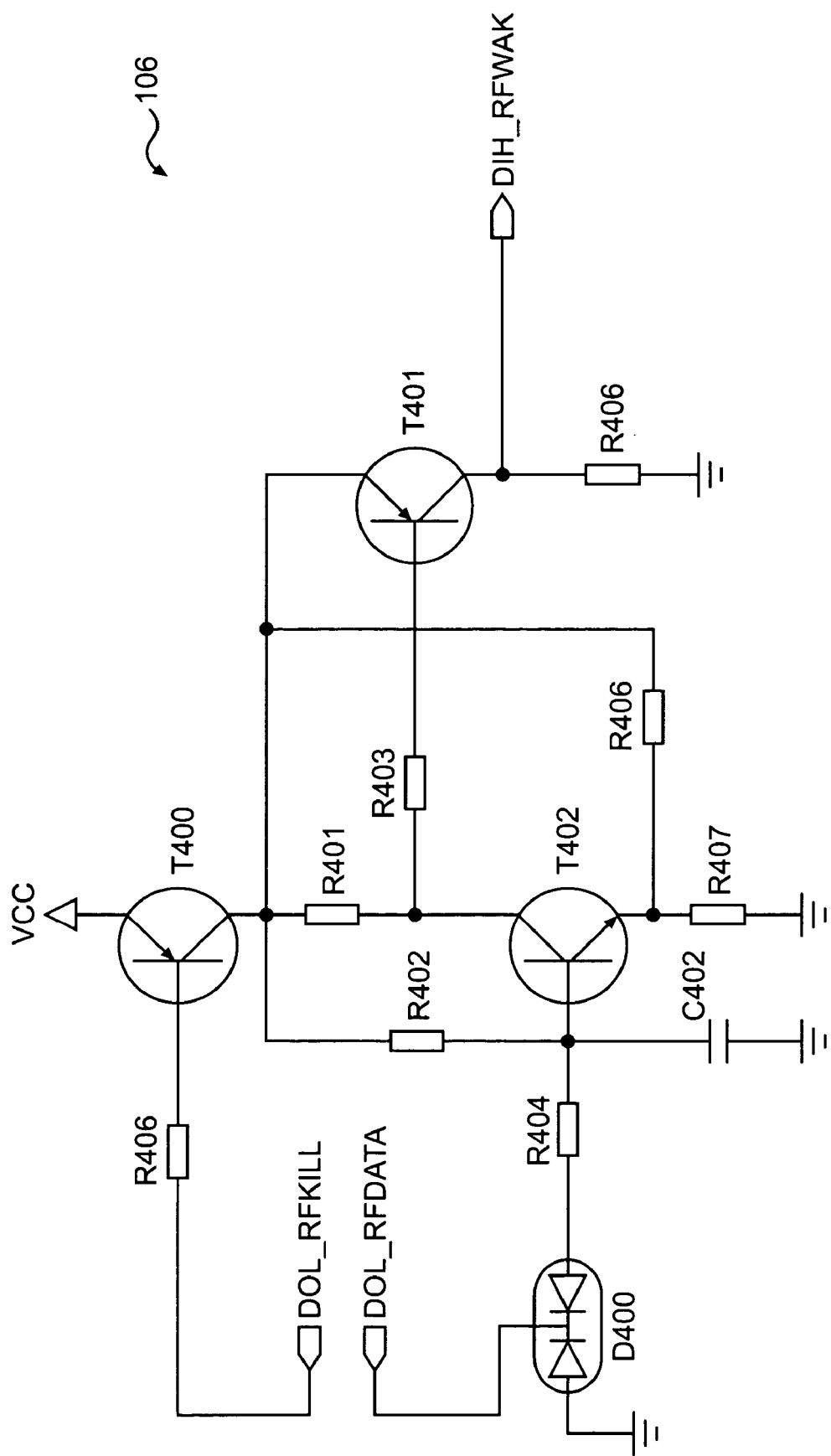
FIG. 2 is a schematic of an RKE circuit illustrating details of an RKE circuit according to one embodiment of the invention.
Figure 3:
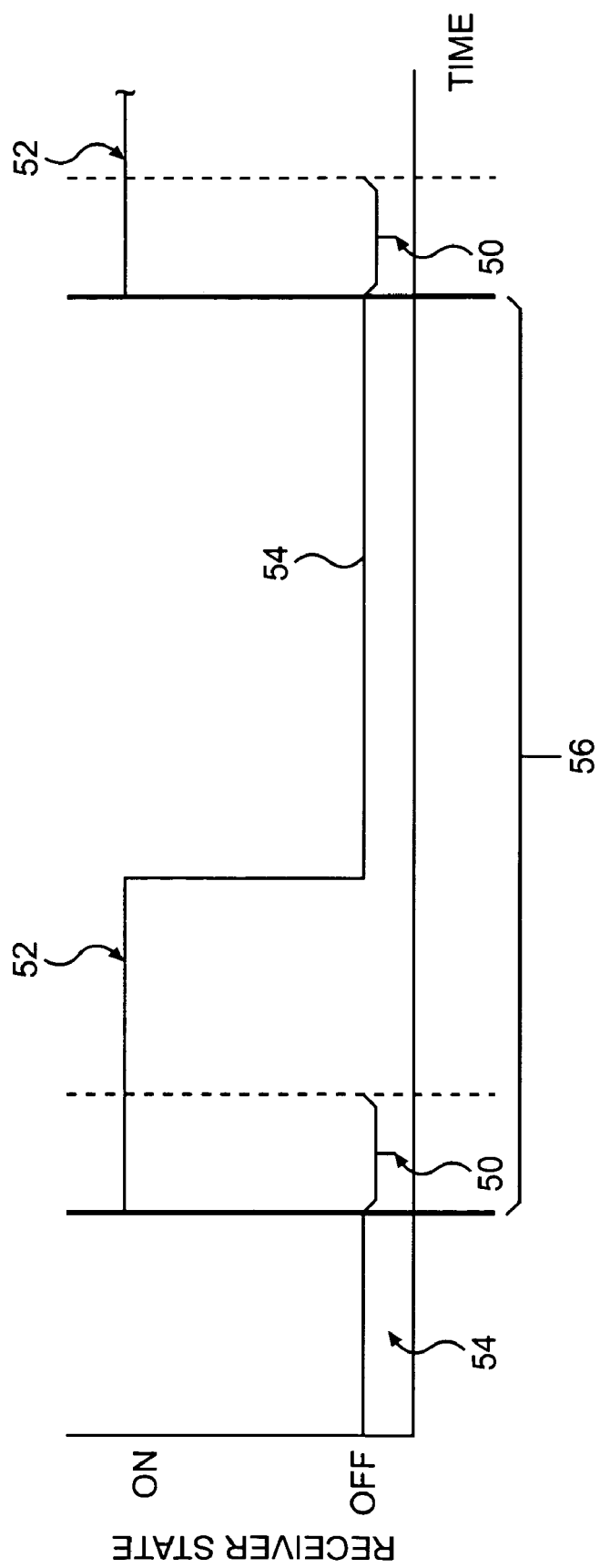
FIG. 3 is a timing diagram illustrating a duty cycle and incoming key fob signals monitored by the RKE circuit according to one embodiment of the invention.

FIG. 2 illustrates one possible embodiment of the control module 106 in the RKE circuit 100 in greater detail. When the vehicle ignition is turned off, the control software 108 confirms the off condition of the vehicle. Generally, when the vehicle is off, the operation of the receiver 102 is duty cycled to conserve power but still needs to selectively sort between noise and valid data to determine if it is receiving a legitimate RF signal from the key fob.

As noted above, the control module 106 includes the pulse blocker circuit 109 to prevent the stabilization pulse from inadvertently waking the microcontroller 104. In this example, the pulse blocker 109 includes a high-speed double diode D400 coupled to the line associated with DI_RFDATA and a resistor R404, which is connected to a capacitor C402.

When the vehicle is confirmed to be off, the control software 108 directs the microcontroller 104 to set the transient period 50 (e.g., 4 ms) over which the microcontroller 104 will power the receiver 102. The transient interval is preferably long enough to allow any transient stabilization pulse to pass before DIH_RFWAK is enabled (i.e., set high) to monitor incoming data.

The control software 108 also configures DIH_RFWAK as a disabled rising edge interrupt and configures DOL_RFKILL as an active low line. DOL_RFKILL controls operation of the receiver 102 by latching the receiver 102 to an ON state when DOL_RFKILL is low and latching the receiver 102 to an OFF state when DOL_RFKILL is high. At this time, the microcontroller 104 is operating in a low power mode, with only its real time internal clock 110 running to periodically turn on the receiver 102 for a selected duration (e.g., 12 ms each 52 ms period). The microcontroller 104 then immediately goes back to sleep after turning on the receiver 102 and sets itself to wake up again after the transient period 50 is over.

The receiver 102 generates a large, transient stabilization pulse when it is initially turned on (e.g., each time DOL_RFKILL goes from high to low). This will ordinarily cause DI_RFDATA to go high even though it is not a data pulse and even though the RKE system 100 does not want to wake the microcontroller 104 in response to the stabilization pulse.

To prevent the stabilization pulse from causing the control module 106 to wake the microcontroller 104, the control software 108 configures DI_RFDATA as an output low during the transient period 50. Thus, during the first 4 ms at which the receiver 102 is turned on in this example, DI_RFDATA will always be low regardless of the state of the receiver 102.

To summarize, during the transient period 50 in each duty cycle, the microcontroller 104 is awake just long enough to turn on the receiver 102 before going back to sleep, DOL_RFKILL is latched low to keep the receiver 102 turned on, and DI_RFDATA is held as an output low. The microcontroller 104 stays in a low power mode in which only its internal clock 110 is running.

Because DI_RFDATA is forced into an output low and DOL_RFKILL is an output low, any stabilization pulse from the receiver 102 applied at the DI_RFDATA line will be bled to ground by the pulse blocker circuit 109 in the control module 106. More particularly, the low DOL_RFKILL will switch T400 on, causing Vcc to be applied at resistor R402. Ordinarily, if DI_RFDATA were allowed to go high during the stabilization pulse, diode D400 will see a high data bit caused by the stabilization pulse, causing resistor R402 to try to charge capacitor C402 in the pulse blocker 109 and therefore try to activate transistor T402.

Because the control software 108 forces DI_RFDATA to stay low during the transient period 50, any charge accumulated in C404 will automatically be discharged through resistor R404 to ground. In one embodiment, R402 is larger than R404, causing C402 to discharge more quickly than it is charged through R402. Because C402 is prevented from charging during the transient period 50, T402 remains turned off during the transient period without relying on an RC circuit to prevent the stabilization pulse from reaching the rest of the control module 106. This eliminates the need to include an RC circuit in the control module 106 to handle the stabilization pulse.

Once the 4 ms transient period 50 has passed, the microcontroller 104 wakes again to start the 8 ms data monitoring period 52, then goes back to sleep. During the data monitoring period 52, the control software 108 stops forcing DI_RFDATA low and configures the DI_RFDATA line as an input capture. This means that the DI_RFDATA line will be normally low, but will reflect any signals that the receiver 102 detects. Any signals that occur in the frequency band of the receiver 102 will appear as demodulated data at DI_RFDATA. DOL_RFKILL remains low to keep the receiver 102 turned on, and the DIH_RFWAK interrupt is enabled so that it will awaken the microcontroller 104 again if the receiver 102 detects incoming data.

During the data monitoring period 52, DI_RFDATA is normally low and is driven by any incoming data on the DI_RFDATA line rather than the control software 108. As a result, there are two possible outcomes in the RKE circuit 100 during the data monitoring period. If the receiver 102 does not demodulate any data during the data monitoring period 52, the microcontroller 104 will wake up again after the data monitoring period 52 is over, disable DIH_RFWAK interrupt, latch off the receiver 102 by making DOL_RFKILL high, and enter the sleep period 54 for the remainder of the total operating period. This places both the microcontroller 104 and the receiver 102 in a low power mode. Once the sleep period 54 expires, the microcontroller 104 wakes up again to start the next transient period 50.

When DOL_RFKILL is high, the receiver 102 is turned off and transistor T400 is also switched off. This keeps the leakage current in the control module 106 low by preventing Vcc (e.g., 5 volts) from being applied to resistor network paths to ground, which include R402, R404, R406 and R407.

Conversely, if data is transmitted on the DI_RFDATA line during the data monitoring period 52 (i.e., if the receiver 102 receives at least two consecutive data bits), the clock 110 that is controlling the length of the data monitoring period 52 expires. Any data pulses from the receiver 102 on the DI_RFDATA line will cause DI_RFDATA to go high, reverse biasing D400, allowing enough current to flow through R402 to cause C402 to charge. Because DI_RFDATA is high in this instance, the charge in C402 will not be discharged through R404. Instead, the biasing voltage will increase to a level slightly greater than the emitter voltage of T402, which is biased by the voltage divider comprising R406 and R407. This bias voltage reduces the overall temperature effect on the activation of T402 by reducing the percentage of T402 base-emitter voltage distribution. Activating T402 will pull the base voltage of T401 close enough to ground to turn on T401. Turning on T401 in turn will cause the voltage across R405, which is connected to the collector of T401, to have a bias of around Vcc (e.g., 5V in this example). This will cause DIH_RFWAK to go high, creating a rising edge at DIH_RFWAK to wake the microcontroller 104 and handle the incoming data.

The actual amount of data to be handled by the microcontroller 104 may be controlled by tuning the RC circuit formed by R404 and C402 to control the discharge time of C402 to correspond with the desired number of edges in the data signal to be captured.

The microcontroller 104 then discriminates the captured data to authenticate the data and respond accordingly. If the incoming data is valid for the particular RKE circuit 100, it will process the data and respond by, for example, unlocking the vehicle door. If the incoming data is not valid, however, the microcontroller 104 will simply go back to sleep and cause the RKE circuit 100 to enter the sleep period 54.

FIG. 4 is a flow diagram of one embodiment of an inventive method 200 conducted by the RKE circuit 100. This method 200 corresponds to the operation of the RKE circuit 100 described above, but may be conducted by other circuits without departing from the scope of the invention.

The method first involves waking the microcontroller to set the transient period for the remainder of the RKE circuit before going back to sleep (block 202). During this transient period, the receiver 102 is latched on and a wake interrupt (e.g., DIH_RFWAK) is disabled, but the input bus (e.g., DI_RFDATA) is held low so that any stabilization pulse from the receiver will not register as data in the RKE circuit (block 204).

After the transient period is over, the microcontroller wakes again to set the data monitoring period before going back to sleep (block 206). During the data monitoring period, the receiver 102 is still kept on, but the input bus is now in an input capture state (block 208) so that it will reflect whatever incoming data is being demodulated by the receiver. The wake interrupt is also enabled so that it will wake the microcontroller if any data is detected.

During the data monitoring period, the RKE circuit will check whether the receiver is demodulating any data (block 210). If the receiver does not demodulate any data during the data monitoring period, the microcontroller will wake after the data monitoring period has expired to set the sleep period (block 212), placing the receiver in an inactive state and disabling the wake interrupt (block 214). The cycle then starts again with the transient period during the next cycle (block 202).

If the receiver does demodulate data during the data monitoring period, however, the microcontroller will wake in response to the data (block 216) and authenticate the data to determine if the data is valid (block 218). If so, the microcontroller will process the data according to any desired process (block 220). Once the data is processed, the microcontroller may go back to sleep (block 222) if warranted by the vehicle operating conditions. If the data is not valid, however, the microcontroller will enter the sleep period (block 214) to deactivate the receiver and the wake interrupt for the remainder of the operating cycle.

By incorporating a transient period in the RKE circuit operation to accommodate a stabilization pulse in the receiver, the invention prevents the stabilization pulse from being treated as data in the RKE circuit. Also, blocking the stabilization pulse from the control module in the RKE circuit ensures that the microcontroller operates in a low power mode as much as possible, reducing the current consumption of the RKE circuit. Further, by duty cycling the receiver operation, the inventive RKE circuit reduces current consumption even further.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A remote keyless entry system, comprising:
    a microcontroller that is controllable by control software and operable in a default sleep mode;
    a receiver that is turned on during a transient period and a data monitoring period by the control software; and
    a control module that includes a data line that is configurable by the control software between a low state and an input capture state, the control module having a pulse blocker that blocks a stabilization pulse generated by the receiver during the transient period.

2. The remote keyless entry system of claim 1, wherein the control software holds the data line at the low state during the transient period to cause the pulse blocker to block the stabilization pulse.

3. The remote keyless entry system of claim 1, wherein the control module comprises:
    a first switch that is connected to a reference voltage and that is turned on when the receiver is turned on;
    a second switch that is turned on when the data line receives a pulse during the data monitoring period; and
    a third switch that is turned on when the second switch is turned on to wake the microcontroller when the data line receives data during the data monitoring period so that the microcontroller can process the data.

4. The remote keyless entry system of claim 3, wherein at least one of the first, second and third switches are first, second and third transistors, respectively.

5. The remote keyless entry system of claim 4, further comprising an energy storage device connected between a base of the second transistor and ground, wherein the pulse blocker includes a resistor and a diode connected to the base of the second transistor to drain the energy storage device and prevent the second transistor from turning on during the transient period when the data line is low.

6. The remote keyless entry system of claim 5, wherein the energy storage device is a capacitor.

7. The remote keyless entry system of claim 5, wherein a voltage divider connected to an emitter of the second transistor causes a biasing voltage on the second transistor to be greater than an emitter voltage of the second transistor, thereby reducing a temperature effect on activation of the second transistor.

8. The remote keyless entry system of claim 1, further comprising a clock that controls a length of the transient period, the data monitoring period, and a sleep period where the receiver is turned off and the microcontroller is in the sleep mode.

9. A control module for a remote keyless entry system, the control module acting as an interface between a receiver and a microcontroller that operates in a default sleep mode, comprising:
    a data line that is configurable by control software between a low state and an input capture state;
    a receiver status line that is configurable by the control software and that reflects whether the receiver is turned on or off, wherein the receiver status line indicates that the receiver is turned on during a transient period and a data monitoring period and turned off during a sleep period by the control software; and
    a control module that includes a data line that is configurable by the control software between a low state and an input capture state, the control module having a pulse blocker that blocks a stabilization pulse generated by the receiver during the transient period, wherein the control software holds the data line at the low state during the transient period to cause the pulse blocker to block the stabilization pulse.

10. The control module of claim 9, wherein the control module comprises:
    a first switch that is connected to a reference voltage and that is turned on when the receiver status line indicates that the receiver is turned on;
    a second switch that is turned on when the data line receives a pulse during the data monitoring period; and
    a third switch that is turned on to wake the microcontroller when the second switch is turned on to wake the microcontroller when the data line receives data during the data monitoring period.

11. The control module of claim 10, wherein at least one of the first, second and third switches are first, second and third transistors, respectively.

12. The control module of claim 11, further comprising an energy storage device connected between a base of the second transistor and ground, wherein the pulse blocker includes a resistor and a diode connected to the base of the second transistor to drain the energy storage device and prevent the second transistor from turning on during the transient period when the data line is low.

13. The control module of claim 12, wherein a voltage divider connected to an emitter of the second transistor causes a biasing voltage on the second transistor to be greater than an emitter voltage of the second transistor, thereby reducing a temperature effect on activation of the second transistor.

14. A method of controlling a remote keyless entry system having a receiver, a control module with a data line that is configurable between a low state and an input capture state, and a microcontroller that operates in a default sleep mode, the method comprising:
    operating in a transient period where the receiver is turned on and the data line is configured to the low state to block a stabilization pulse from the receiver from waking the microcontroller;

operating in a data monitoring period where the receiver is turned on and the data line is configured to the input capture state, wherein the control module wakes the microcontroller when data is received by the receiver; and operating in a sleep period where the receiver is turned off.

15. The method of claim 14, further comprising waking the microcontroller before at least one of the steps of operating in the transient period, the data monitoring period, and the sleep period to set said at least one of the transient period, the data monitoring period, and the sleep period.

16. The method of claim 15, wherein the waking step comprises setting a timer to expire at an end of at least one of the transient period, the data monitoring period, and the sleep period, and further comprising resetting the timer at said end.

17. The method of claim 14, wherein the step of operating in the transient period comprises blocking the stabilization pulse from turning on a switch in the control module.

* * * * *